United States Patent
Connell, II

(10) Patent No.: US 8,306,261 B2
(45) Date of Patent: Nov. 6, 2012

(54) DETECTION OF AN OBJECT IN AN IMAGE

(75) Inventor: Jonathan H. Connell, II, Cortlandt-Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 1181 days.

(21) Appl. No.: 12/138,683

(22) Filed: Jun. 13, 2008

(65) Prior Publication Data

US 2009/0310821 A1    Dec. 17, 2009

(51) Int. Cl.
G06K 9/00    (2006.01)
G06K 9/48    (2006.01)
G06K 9/62    (2006.01)

(52) U.S. Cl. ............ 382/103; 382/199; 382/228

(58) Field of Classification Search .......... 382/103, 382/218, 283, 165, 170, 209, 199, 194, 171, 382/228; 375/240.08
See application file for complete search history.

(56) References Cited

U.S. PATENT DOCUMENTS

| | | | |
|---|---|---|---|
| 5,469,536 A | 11/1995 | Blank | |
| 5,943,441 A | 8/1999 | Michael | |
| 6,349,113 B1 * | 2/2002 | Mech et al. | 375/240.08 |
| 7,227,996 B2 | 6/2007 | Imagawa et al. | |
| 7,245,326 B2 * | 7/2007 | Orlick | 348/448 |
| 7,466,872 B2 * | 12/2008 | Oh et al. | 382/266 |
| 2002/0136459 A1 | 9/2002 | Imagawa et al. | |
| 2002/0175921 A1 | 11/2002 | Xu et al. | |
| 2003/0063797 A1 | 4/2003 | Mao | |
| 2004/0247179 A1 | 12/2004 | Miwa et al. | |
| 2006/0159342 A1 | 7/2006 | Sun et al. | |

* cited by examiner

*Primary Examiner* — Chan S Park
*Assistant Examiner* — Ha Le
(74) *Attorney, Agent, or Firm* — Anna L. Linne; Hoffman Warnick LLC

(57) ABSTRACT

The invention provides a method, system, and program product for detecting an object in a digital image. In one embodiment, the invention includes: deriving an initial object indication mask based on pixel-wise differences between a first digital image and a second digital image, at least one of which includes the object; performing an edge finding operation on both the first and second digital images, wherein the edge finding operation includes marking added edges; generating a plurality of straight linear runs of pixels across an image containing the object, wherein each of the plurality of straight linear runs starts and ends on an added edge and is contained within the initial object indication mask; and forming a final object indication mask by retaining only pixels that are part of at least one of the plurality of straight linear runs.

19 Claims, 5 Drawing Sheets

US 8,306,261 B2

DETECTION OF AN OBJECT IN AN IMAGE

TECHNICAL FIELD

The invention relates generally to image analysis and, more particularly, to the detection of an object based on differences in a plurality of digital images.

BACKGROUND OF THE INVENTION

The accurate detection of an object in an image may be useful in any number of contexts, from engineering and the visual arts to inventory control and law enforcement. Often, a simple background subtraction is conducted based on two or more images in which an object of interest has moved relative to the background or is alternately present and absent. Typically, background subtraction is made on a pixel-by-pixel basis. However, where an object and the background are similar in color and/or intensity, simple background subtraction often inaccurately expands the object's boundaries to include portions of the background. Often, such similarities in color and/or intensity are attributable to the presence of the object itself, which may cast a shadow or reflect light onto a background. In reflecting light, an object may even impart its own color onto a background.

To combat such effects, simple background subtraction is often conducted with a very high pixel change threshold. This leads to equally unsatisfactory results, however, with portions of the object that are similar in color and/or intensity being inaccurately attributed to the background.

Accordingly, there exists a need in the art to overcome the deficiencies and limitations described hereinabove.

SUMMARY OF THE INVENTION

The invention provides a method, system, and program product for detecting an object in a digital image. A first aspect of the invention provides a method of identifying a portion of a digital image corresponding to an object, the method comprising: deriving an initial object indication mask based on pixel-wise differences between a first digital image and a second digital image, at least one of which includes the object; performing an edge finding operation on both the first and second digital images, wherein the edge finding operation includes marking added edges; generating a plurality of straight linear runs of pixels across an image containing the object, wherein each of the plurality of straight linear runs starts and ends on an added edge and is contained within the initial object indication mask; and forming a final object indication mask by retaining only pixels that are part of at least one of the plurality of straight linear runs.

A second aspect of the invention provides a system for identifying a portion of a digital image corresponding to an object, the system comprising: a system for deriving an initial object indication mask based on pixel-wise differences between a first digital image and a second digital image, at least one of which includes the object; a system for performing an edge finding operation on both the first and second digital images, wherein the edge finding operation includes marking added edges; a system for generating a plurality of straight linear runs of pixels across an image containing the object, wherein each of the plurality of straight linear runs starts and ends on an added edge and is contained within the initial object indication mask; and a system for forming a final object indication mask by retaining only pixels that are part of at least one of the plurality of straight linear runs.

A third aspect of the invention provides a program product stored on a computer-readable medium, which when executed, identifies a portion of a digital image corresponding to an object, the system comprising: program code for deriving an initial object indication mask based on pixel-wise differences between a first digital image and a second digital image, at least one of which includes the object; program code for performing an edge finding operation on both the first and second digital images, wherein the edge finding operation includes marking added edges; program code for generating a plurality of straight linear runs of pixels across an image containing the object, wherein each of the plurality of straight linear runs starts and ends on an added edge and is contained within the initial object indication mask; and program code for forming a final object indication mask by retaining only pixels that are part of at least one of the plurality of straight linear runs.

A fourth aspect of the invention provides a method for deploying an application for detecting an object in a digital image, comprising: providing a computer infrastructure being operable to: derive an initial object indication mask based on pixel-wise differences between a first digital image and a second digital image, at least one of which includes the object; perform an edge finding operation on both the first and second digital images, wherein the edge finding operation includes marking added edges; generate a plurality of straight linear runs of pixels across an image containing the object, wherein each of the plurality of straight linear runs starts and ends on an added edge and is contained within the initial object indication mask; and form a final object indication mask by retaining only pixels that are part of at least one of the plurality of straight linear runs.

The illustrative aspects of the present invention are designed to solve the problems herein described and other problems not discussed, which are discoverable by a skilled artisan.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

Figure 1:
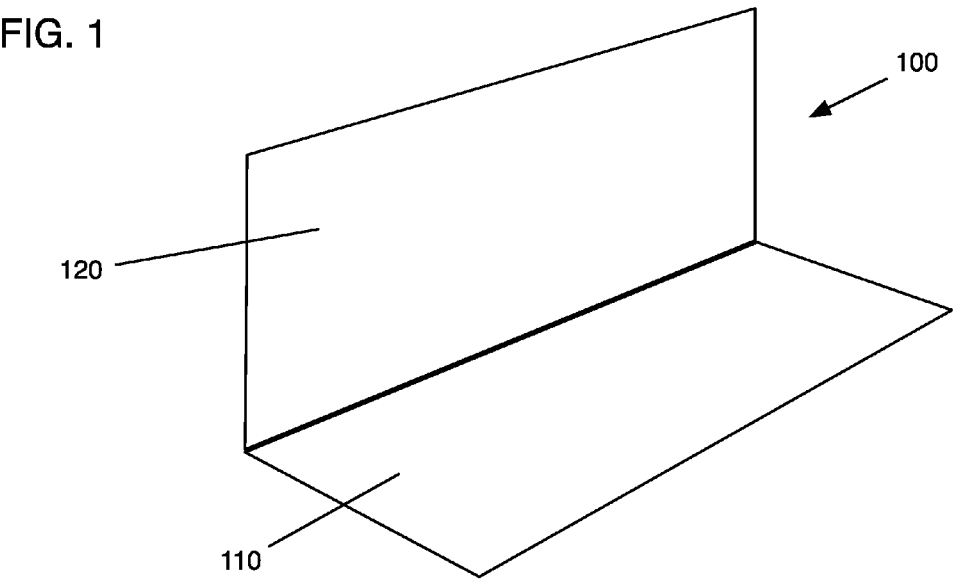
FIGS. 1-2 are simplified depictions of two digital images, one of which (FIG. 2) contains an object to be detected.
Figure 2:
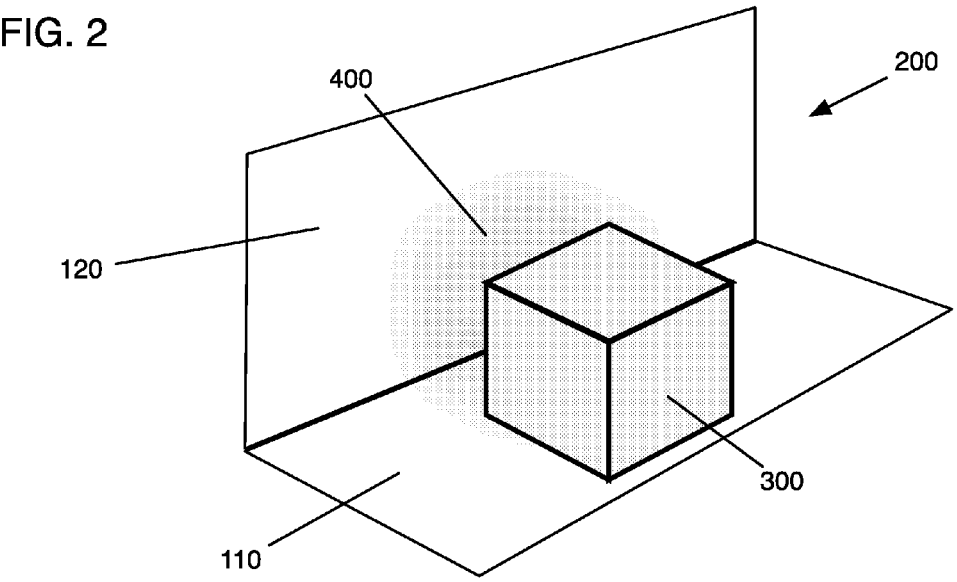

Referring now to the drawings, FIG. 1 shows a first image 100 including a floor 110 and wall 120. FIG. 2 shows a second image 200, wherein an object 300 has been placed on the floor

110. As can be seen, the object 300 causes a shadow 400 upon both the floor 110 and the wall 120. It is in just such a situation that simple background subtraction is often ineffective at properly identifying the boundaries of the object 300.

Figure 3:
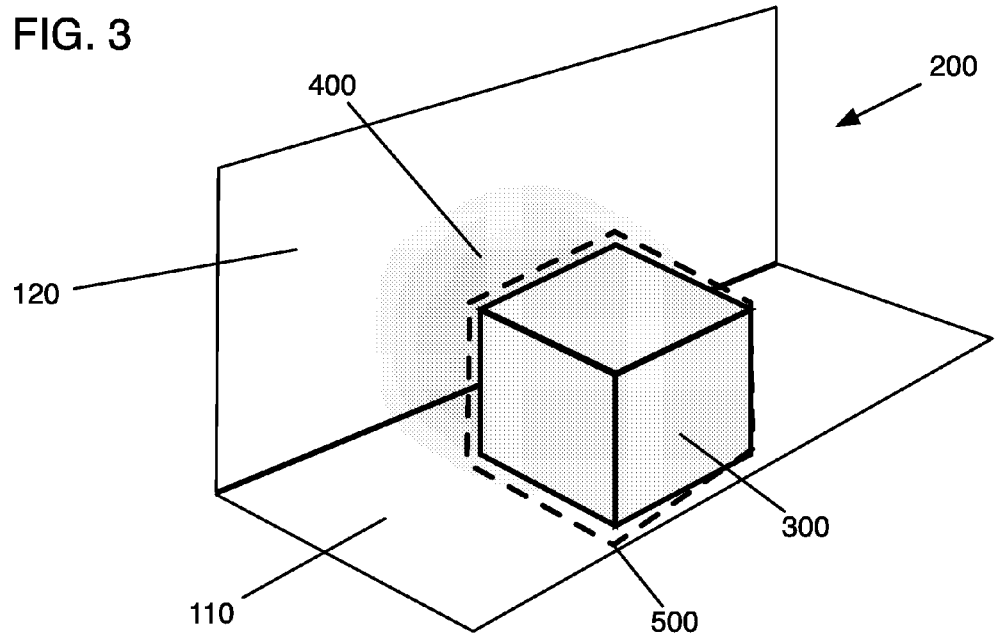
FIGS. 3-4 show general and detailed views, respectively, of the application of a background subtraction based on the images depicted in FIGS. 1-2.
Figure 4:
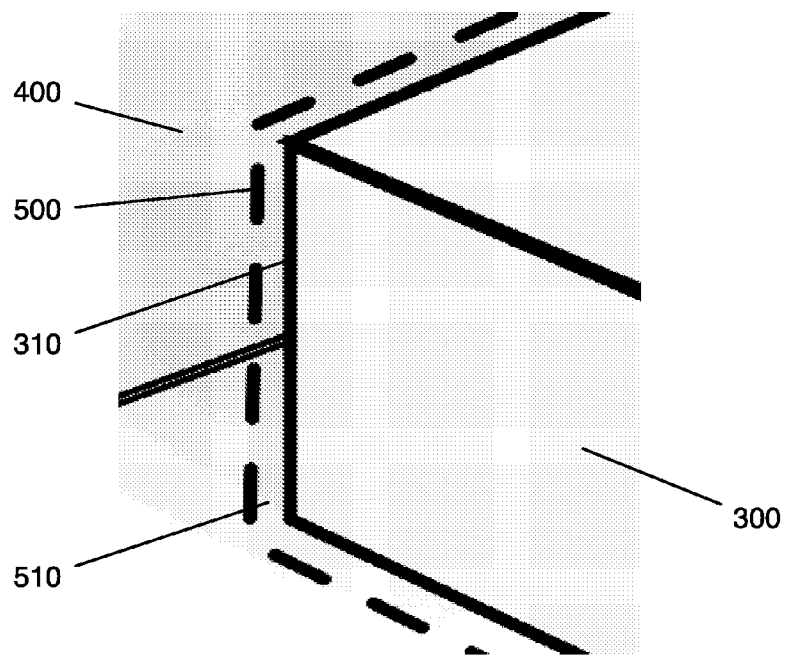

FIG. 3 shows an initial object indication mask 500 (the boundaries of which are depicted with a dashed line) of the object 300 derived using simple background subtraction. As can be seen, and as is shown in greater detail in FIG. 4, where the object 300 and its background (here, floor 110 and wall 120) are similar in intensity and/or color due to the shadow 400 cast by the object 300, the initial object indication mask 500 is expanded beyond the true boundary 310 of the object 300 to include portions of both the floor 110 and the wall 120. That is, a gap 510 exists between the initial object indication mask 500 and the true boundary 310, comprising portions of the floor 110 and wall 120. It should be noted that the expansion of the initial object indication mask may occur for any number of reasons that result in a similarity in intensity and/or color between the object and its background. The impact of the shadow 400 in FIGS. 2-4 is provided simply for purposes of illustration of one such reason.

Figure 5:
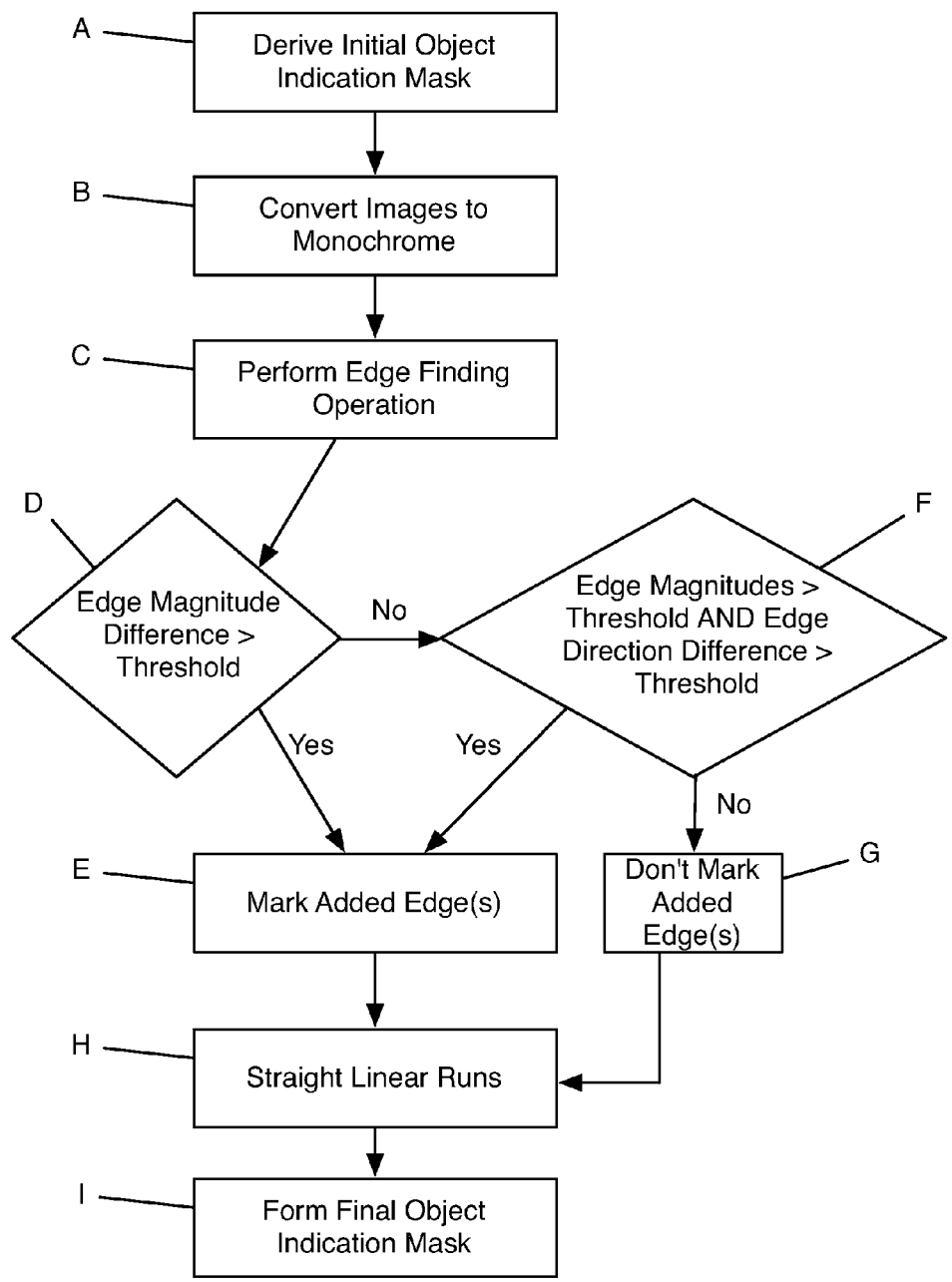
FIG. 5 shows a flow diagram of an illustrative method according to the invention.

FIG. 5 shows a flow diagram of an illustrative method according to the invention. At A, an initial object indication mask is derived (e.g., using a simple pixel-by-pixel background subtraction) using at least two digital images (representing movement or the presence/absence of an object of interest).

In some embodiments, the initial object indication mask is derived using the standard red, green, blue (RGB) color model. In other embodiments, another color model is used (e.g., the hue, saturation, value (HSV) color model, the CIELAB color model, opponent color models (R-G, Y-B, Wh-Bk), etc.). In still other embodiments, the digital images may be black-and-white. Where the RGB color model is used, the initial object indication mask at A results in an object map with each pixel set to 255 if the difference in any of the red, green, or blue color channels at the corresponding pixel exceeds a pre-defined threshold.

At B, each of the images is converted to monochrome. If using an RGB color model, this may be done by averaging the red, green, and blue values. At C, an edge finding operation (e.g., using a Sobel edge operator) is performed to resolve spatial differences (increases or decreases along the X- and Y-axes) and determine an overall edge magnitude (edge strength) and edge direction. Alternatively, the edge finding could be done directly in the color image (no step B). In this case, a Sobel operator is applied separately to each of the color channels (e.g., red, green, and blue), then the color channel having the maximum magnitude is selected to represent the edge's overall magnitude and direction.

At D, it is determined whether a difference in the edge magnitudes determined at C exceeds a pre-defined threshold. If so (i.e., Yes at D), at E, the pixel is deemed part of an added edge and is so marked. If not (i.e., No at D), at F, it is determined whether the edge magnitude in each image exceeds a pre-defined threshold and the difference in edge directions between the two images exceeds a pre-defined threshold. If so (i.e., Yes at F), at E, the pixel is deemed part of an added edge and is so marked. If not (i.e., No at F), at G, the pixel is not deemed part of an added edge and is not marked.

At H, the added edge(s) marked at E are used to "trim" the initial object indication mask by performing a plurality of pixel-wise "runs" across an image. Each run begins and ends on an added edge and is contained within the initial object indication mask. As the "run" progresses over the image, if a pixel is encountered that has been deemed part of an added edge, the run switches to an activated state. The run then remains in the activated state unless it subsequently encounters a pixel that was not included in the initial object indication mask, at which point the run switches to a deactivated state until another pixel deemed part of an added edge is encountered. If, instead, the activated run encounters another pixel deemed to be part of an added edge, all pixels between the first and second pixels so deemed are marked, thereby "trimming" the initial object indication mask by, for example, removing from the initial object indication mask portions of the background having a similar intensity and/or color.

The "runs" across the image described above are preferably made horizontally, vertically, and in the two diagonal directions of the image. In addition, it may be preferable in some cases to set a predetermined maximum pixel span (e.g., 50 pixels) across which the run may progress while in an activated state without encountering another pixel deemed a part of an added edge. Any runs longer than this are discarded. This may aid in preventing spurious linking of widely separated added edges.

Finally, at I, a final object indication mask is formed based on the "trimmed" portions of the initial object indication mask. That is, using a pixel-wise "OR" operation, runs in various directions are combined to yield a more accurate mask of the object. Typically, the final object indication mask is locally convex mask for the object region. Such a final object indication mask may be further refined by any number of methods or techniques (e.g., removal of small interior holes, application of pseudo-morphological operators based on local pixel averages, closure of "bays" in the object outline, etc.), as will be known to one skilled in the art.

Figure 6:
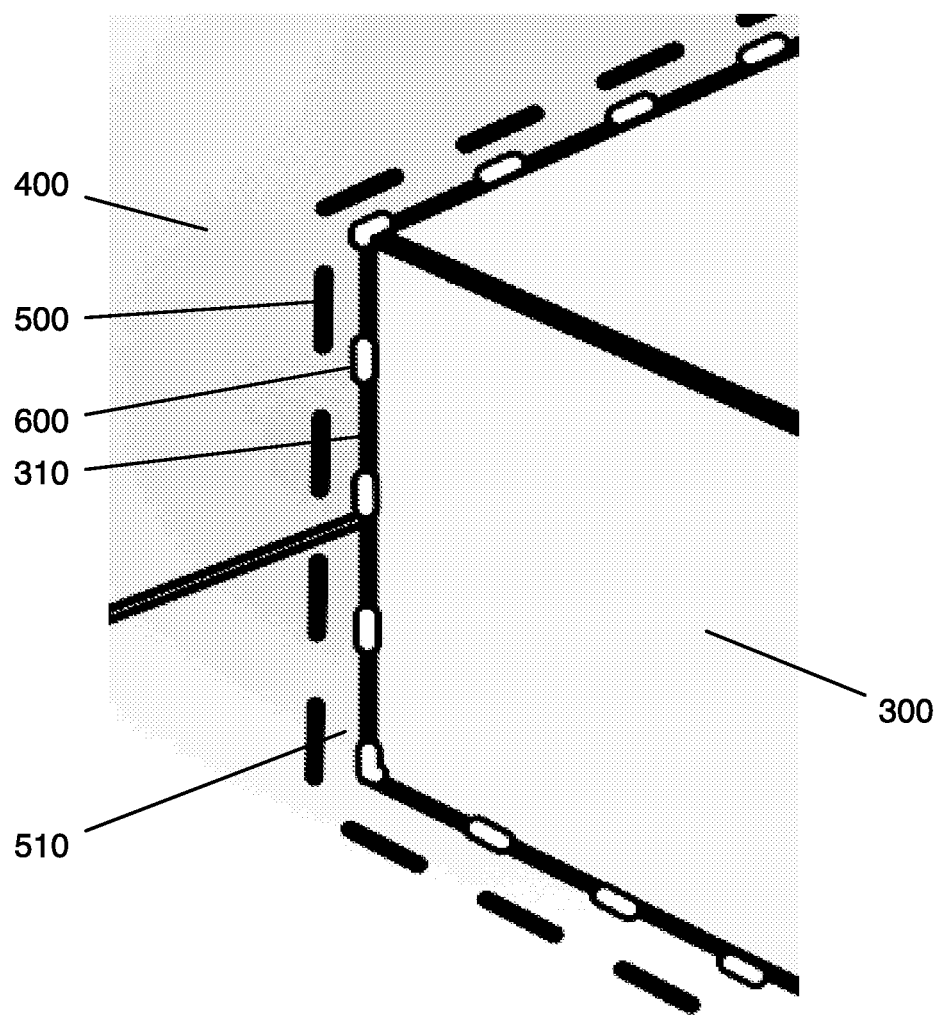
FIG. 6 shows a detailed view of a final object indication mask generated according to an embodiment of the invention, as applied to the image depicted in FIG. 4.

FIG. 6 shows the view in FIG. 4 following the generation of the final object indication mask 600 (the boundaries of which are indicated with a dashed line) according to a method of the invention such as that described above. As can be seen, the final object indication mask 600 (based on the "trimmed" portions of the initial object indication mask) much more closely tracks the true boundary 310 of the object 300 than did the initial object indication mask 500 (based only on the background subtraction), particularly in areas where the object 300 and its background are similar in intensity and/or color.

Figure 7:
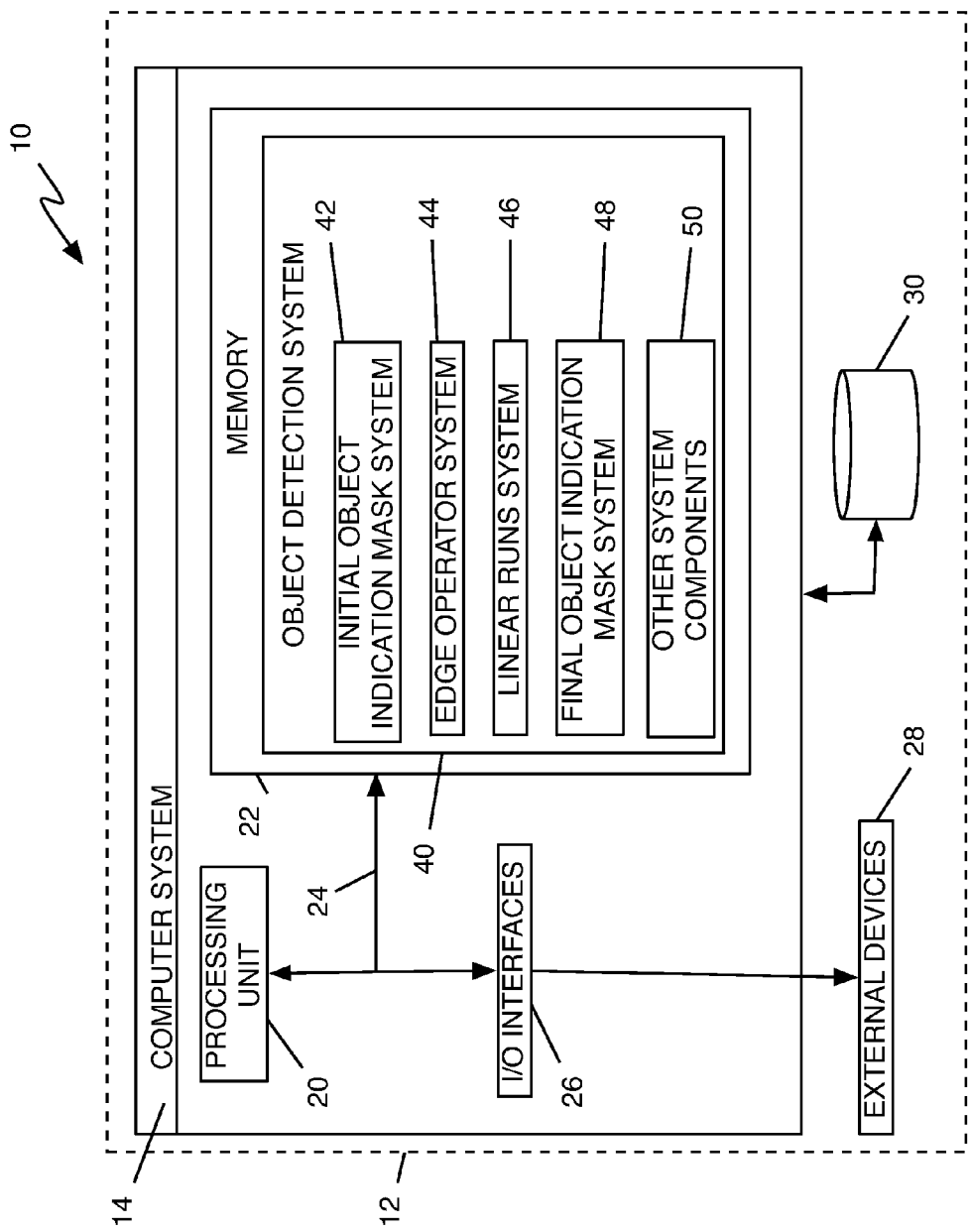
FIG. 7 shows a block diagram of an illustrative system according to an embodiment of the invention.

FIG. 7 shows an illustrative system 10 for detecting an object in a digital image. To this extent, system 10 includes a computer infrastructure 12 that can perform the various process steps described herein for detecting an object in a digital image. In particular, computer infrastructure 12 is shown including a computer system 14 that comprises an object detection system 40, which enables computer system 14 to identify a boundary of an object by performing the process steps of the invention.

Computer system 14 is shown including a processing unit 20, a memory 22, input/output (I/O) interfaces 26, and a bus 24. Further, computer system 14 is shown in communication with external devices 28 and a storage system 30. As is known in the art, in general, processing unit 20 executes computer program code, such as object detection system 40, that is stored in memory 22 and/or storage system 30. While executing computer program code, processing unit 20 can read and/or write data from/to memory 22, storage system 30, and/or I/O interface 26. Bus 24 provides a communication link between each of the components in computer system 14. External devices 28 can comprise any device that enables a user (not shown) to interact with computer system 14 or any device that enables computer system 14 to communicate with one or more other computer systems.

In any event, computer system 14 can comprise any general purpose computing article of manufacture capable of executing computer program code installed by a user (e.g., a personal computer, server, handheld device, etc.). However, it is understood that computer system 14 and object detection system 40 are only representative of various possible computer systems that may perform the various process steps of the invention. To this extent, in other embodiments, computer system 14 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively.

Similarly, computer infrastructure 12 is only illustrative of various types of computer infrastructures for implementing the invention. For example, in one embodiment, computer infrastructure 12 comprises two or more computer systems (e.g., a server cluster) that communicate over any type of wired and/or wireless communications link, such as a network, a shared memory, or the like, to perform the various process steps of the invention. When the communications link comprises a network, the network can comprise any combination of one or more types of networks (e.g., the Internet, a wide area network, a local area network, a virtual private network, etc.). Regardless, communications between the computer systems may utilize any combination of various types of transmission techniques.

As previously mentioned, object detection system 40 enables computer system 14 to detect an object in a digital image. To this extent, object detection system 40 is shown including an initial object indication mask system 42, an edge operator system 44, a linear runs system 46, and a final object indicator mask system 48. Operation of each of these systems is discussed above. Object detection system 40 may further include other system components 50 to provide additional or improved functionality to object detection system 40. It is understood that some of the various systems shown in FIG. 7 can be implemented independently, combined, and/or stored in memory for one or more separate computer systems 14 that communicate over a network. Further, it is understood that some of the systems and/or functionality may not be implemented, or additional systems and/or functionality may be included as part of system 10.

While shown and described herein as a method and system for detecting an object in a digital image, it is understood that the invention further provides various alternative embodiments. For example, in one embodiment, the invention provides a computer-readable medium that includes computer program code to enable a computer infrastructure to detect an object in a digital image. To this extent, the computer-readable medium includes program code, such as object detection system 40, that implements each of the various process steps of the invention. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computer system, such as memory 22 and/or storage system 30 (e.g., a fixed disk, a read-only memory, a random access memory, a cache memory, etc.), and/or as a data signal traveling over a network (e.g., during a wired/wireless electronic distribution of the program code).

In another embodiment, the invention provides a business method that performs the process steps of the invention on a subscription, advertising, and/or fee basis. That is, a service provider could offer to detect an object in a digital image, as described above. In this case, the service provider can create, maintain, support, etc., a computer infrastructure, such as computer infrastructure 12, that performs the process steps of the invention for one or more customers. In return, the service provider can receive payment from the customer(s) under a subscription and/or fee agreement and/or the service provider can receive payment from the sale of advertising space to one or more third parties.

In still another embodiment, the invention provides a method of generating a system for detecting an object in a digital image. In this case, a computer infrastructure, such as computer infrastructure 12, can be obtained (e.g., created, maintained, having made available to, etc.) and one or more systems for performing the process steps of the invention can be obtained (e.g., created, purchased, used, modified, etc.) and deployed to the computer infrastructure. To this extent, the deployment of each system can comprise one or more of (1) installing program code on a computer system, such as computer system 14, from a computer-readable medium; (2) adding one or more computer systems to the computer infrastructure; and (3) incorporating and/or modifying one or more existing systems of the computer infrastructure, to enable the computer infrastructure to perform the process steps of the invention.

As used herein, it is understood that the terms "program code" and "computer program code" are synonymous and mean any expression, in any language, code or notation, of a set of instructions intended to cause a computer system having an information processing capability to perform a particular function either directly or after either or both of the following: (a) conversion to another language, code or notation; and (b) reproduction in a different material form. To this extent, program code can be embodied as one or more types of program products, such as an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A method of identifying a portion of a digital image corresponding to an object, the method comprising:

deriving an initial object indication mask based on pixel-wise differences between a first digital image and a second digital image, at least one of which includes the object;

performing an edge finding operation on both the first and second digital images, wherein the edge finding operation includes:

determining whether pixel-wise differences in edge strength between the first digital image and the second digital image exceed a pre-determined edge strength threshold and pixel-wise differences in edge direction between the first digital image and the second digital image exceed a pre-determined edge direction threshold; and marking at least one added edge, wherein the at least one added edge includes any pixel determined to have an edge strength difference exceeding the pre-determined edge strength threshold and an edge direction difference exceeding the pre-determined edge direction threshold;

generating a plurality of straight linear runs of pixels across an image containing the object, wherein each of the plurality of straight linear runs starts and ends on an added edge and is contained within the initial object indication mask; and forming a final object indication mask by retaining only pixels that are part of at least one of the plurality of straight linear runs.

2. The method of claim 1, wherein the initial object indication mask is derived using a red, green, blue (RGB) color model.

3. The method of claim 1, wherein the initial object indication mask is derived using an opponent color model.

4. The method of claim 1, wherein performing an edge finding operation includes converting each of the digital images to monochrome images by averaging the red, green, and blue values for each pixel.

5. The method of claim 1, wherein the plurality of straight linear runs includes at least one horizontal run, at least one vertical run, and at least two diagonal runs.

6. The method of claim 1, wherein performing an edge finding operation includes using a Sobel edge operator.

7. The method of claim 1, further comprising:
discarding each of the plurality of straight linear runs if it exceeds a predetermined maximum span.

8. A system for identifying a portion of a digital image corresponding to an object, the system comprising:
at least one computing device including at least one processor operable to carry out a method comprising:
deriving an initial object indication mask based on pixel-wise differences between a first digital image and a second digital image, at least one of which includes the object;
performing an edge finding operation on both the first and second digital images, wherein the edge finding operation includes:
determining whether pixel-wise differences in edge strength between the first digital image and the second digital image exceed a pre-determined edge strength threshold and pixel-wise differences in edge direction between the first digital image and the second digital image exceed a pre-determined edge direction threshold; and
marking at least one added edge, wherein the at least one added edge includes any pixel determined to have an edge strength difference exceeding the pre-determined edge strength threshold and an edge direction difference exceeding the pre-determined edge direction threshold;
generating a plurality of straight linear runs of pixels across an image containing the object, wherein each of the plurality of straight linear runs starts and ends on an added edge and is contained within the initial object indication mask; and
forming a final object indication mask by retaining only pixels that are part of at least one of the plurality of straight linear runs.

9. The system of claim 8, wherein deriving the initial object indication mask includes using a red, green, blue (RGB) color model.

10. The system of claim 8, wherein deriving the initial object indication mask includes using an opponent color model.

11. The system of claim 8, wherein performing the edge finding operation includes converting each of the digital images to monochrome images by averaging the red, green, and blue values for each pixel.

12. The system of claim 8, wherein generating the plurality of straight linear runs includes generating at least one horizontal run, at least one vertical run, and at least two diagonal runs.

13. The system of claim 8, wherein performing an edge finding operation includes employing a Sobel edge operator.

14. A computer-readable storage medium containing a program product, which when executed, is operable to identify a portion of a digital image corresponding to an object, by performing a method comprising:
deriving an initial object indication mask based on pixel-wise differences between a first digital image and a second digital image, at least one of which includes the object;
performing an edge finding operation on both the first and second digital images, wherein the edge finding operation includes:
determining whether pixel-wise differences in edge strength between the first digital image and the second digital image exceed a pre-determined edge strength threshold and pixel-wise differences in edge direction between the first digital image and the second digital image exceed a pre-determined edge direction threshold; and
marking at least one added edge, wherein the at least one added edge includes any pixel determined to have an edge strength difference exceeding the pre-determined edge strength threshold and an edge direction difference exceeding the pre-determined edge direction threshold;
generating a plurality of straight linear runs of pixels across an image containing the object, wherein each of the plurality of straight linear runs starts and ends on an added edge and is contained within the initial object indication mask; and
forming a final object indication mask by retaining only pixels that are part of at least one of the plurality of straight linear runs.

15. The computer-readable storage medium of claim 14, wherein the initial object indication mask is derived using a red, green, blue (RGB) color model.

16. The computer-readable storage medium of claim 15, wherein performing the edge finding operation includes converting the digital images to monochrome images by averaging the red, green, and blue values for each pixel.

17. The computer-readable storage medium of claim 14, wherein generating the plurality of straight linear runs includes generating at least one horizontal run, at least one vertical run, and at least two diagonal runs.

18. The computer-readable storage medium of claim 14, wherein deriving the initial object indication mask includes using an opponent color model.

19. A method for deploying an application for detecting an object in a digital image, comprising:
  providing a computer infrastructure being operable to:
    derive an initial object indication mask based on pixel-wise differences between a first digital image and a second digital image, at least one of which includes the object;
    perform an edge finding operation on both the first and second digital images, wherein the edge finding operation includes:
      determining whether pixel-wise differences in edge strength between the first digital image and the second digital image exceed a pre-determined edge strength threshold and pixel-wise differences in edge direction between the first digital image and the second digital image exceed a pre-determined edge direction threshold; and
      marking at least one added edge, wherein the at least one added edge includes any pixel determined to have an edge strength difference exceeding the pre-determined edge strength threshold and an edge direction difference exceeding the pre-determined edge direction threshold;
    generate a plurality of straight linear runs of pixels across an image containing the object, wherein each of the plurality of straight linear runs starts and ends on an added edge and is contained within the initial object indication mask; and
    form a final object indication mask by retaining only pixels that are part of at least one of the plurality of straight linear runs.

* * * * *